(12) United States Patent
Ooba

(10) Patent No.: US 9,783,371 B2
(45) Date of Patent: Oct. 10, 2017

(54) ARTICLE ALIGNMENT APPARATUS FOR ALIGNING ARTICLE ON CONVEYOR

(71) Applicant: FANUC CORPORATION, Minamitsuru-gun, Yamanashi (JP)

(72) Inventor: Masafumi Ooba, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/755,295

(22) Filed: Jun. 30, 2015

(65) Prior Publication Data

US 2016/0001983 A1 Jan. 7, 2016

(30) Foreign Application Priority Data

Jul. 4, 2014 (JP) .................................. 2014-138948

(51) Int. Cl.
| | | |
|---|---|---|
| G06F 7/00 | (2006.01) | |
| B65G 47/14 | (2006.01) | |
| B65G 37/00 | (2006.01) | |
| B65G 43/08 | (2006.01) | |
| G05B 19/418 | (2006.01) | |

(52) U.S. Cl.
CPC ............. *B65G 47/14* (2013.01); *B65G 37/00* (2013.01); *B65G 43/08* (2013.01); *G05B 19/4182* (2013.01); *G05B 2219/31048* (2013.01); *Y02P 90/04* (2015.11); *Y02P 90/083* (2015.11)

(58) Field of Classification Search
USPC ........................................................ 700/218
See application file for complete search history.

(56) References Cited

U.S. PATENT DOCUMENTS

| | | | |
|---|---|---|---|
| 2005/0075752 A1* | 4/2005 | Ban ........................ | B25J 9/1697 |
| | | | 700/213 |
| 2007/0108109 A1 | 5/2007 | Erlandsson-Warvelin | |
| 2008/0082206 A1* | 4/2008 | Egami .................... | B65G 47/31 |
| | | | 700/230 |
| 2010/0305754 A1 | 12/2010 | Ban | |
| 2012/0165972 A1* | 6/2012 | Wappling ............... | B25J 9/1687 |
| | | | 700/213 |
| 2015/0134110 A1 | 5/2015 | Koyanagi | |

FOREIGN PATENT DOCUMENTS

| | | |
|---|---|---|
| CN | 102648442 | 8/2012 |
| DE | 19752908 | 6/1999 |
| DE | 102006061571 | 7/2008 |
| DE | 102010022357 | 12/2010 |
| JP | 2001239484 | 9/2001 |

(Continued)

*Primary Examiner* — Kyle Logan
(74) *Attorney, Agent, or Firm* — RatnerPrestia

(57) ABSTRACT

An article alignment apparatus includes an interval setting unit configured to specify a distance between articles aligned along a movement direction of a conveyor, a movement amount acquisition unit configured to acquire a movement amount of a placement portion of the conveyor from a detector, a virtual target generation unit configured to generate a virtual target which serves as a reference in positioning the article on the placement portion, before a robot executes a placement operation of the article, and a placement operation execution unit configured to place the article within the virtual target by tracking the virtual target moving together with the conveyor based on information detected by the detector.

3 Claims, 6 Drawing Sheets

(56) References Cited

FOREIGN PATENT DOCUMENTS

| | | |
|---|---|---|
| JP | 2001278447 | 10/2001 |
| JP | 2002192487 | 7/2002 |
| JP | 2002274641 | 9/2002 |
| JP | 2002-316716 A | 10/2002 |
| JP | 2006131363 | 5/2006 |
| JP | 2010006590 | 1/2010 |
| JP | 2010280010 | 12/2010 |
| JP | 2014104524 | 6/2014 |
| WO | 2014013608 | 1/2014 |

\* cited by examiner

ARTICLE ALIGNMENT APPARATUS FOR ALIGNING ARTICLE ON CONVEYOR

BACKGROUND ART

1. Technical Field

The present invention relates to an article alignment apparatus used to align an article on a conveyor.

2. Description of the Related Art

Known article alignment apparatuses are used to align articles along an advancing direction of conveyors by industrial robots. For example, an article alignment apparatus is known, in which articles are successively placed on a bucket conveyor provided with buckets for accommodating the articles at regular intervals. An article alignment apparatus is known, in which articles are successively placed at the same location in an advancing direction of a belt conveyor (see JP 2002-316716 A).

When articles are moved between conveyors, the articles are sometimes required to be aligned at predetermined intervals for a next process. However, when containers, such as trays, aligned in predetermined intervals are used for aligning articles, it is necessary to collect the containers in a post-process and to install a phototube sensor or the like for detecting positions of the trays, and thus the cost tends to increase.

According to a known technique for successively placing an article at the same location, an interval of the articles in a conveyance direction changes depending on a conveyance speed of the conveyor and a cycle time of a picking up process and a placing process of the article by a robot. Thus, the intervals between the articles need to be corrected in the post-process. When a conveyor which performs pitch feeding at a predetermined interval is used, articles can be aligned at regular intervals. However, there is a need to use the conveyor driven by an expensive servomotor, and thus the cost tends to increase.

According to a technique in which marks applied to a belt of a conveyor at predetermined intervals are detected by a phototube sensor in order to align articles based on the detection result, it is necessary to apply the marks to the belt every time it is replaced. Further, if the mark disappears, the article cannot be aligned as intended.

Therefore, there is a need for an article alignment apparatus with a simplified configuration, which can align articles at predetermined intervals.

SUMMARY OF THE INVENTION

According to a first aspect of the present invention, there is provided an article alignment apparatus, comprising: a conveyor which includes a placement portion on which an article is placed, and a detector for detecting a movement amount of the placement portion; a robot which includes a tool capable of holding an article and is configured to successively place an article or a group of articles having a predetermined positional relationship relative to each other, in alignment on the placement portion along a movement direction of the conveyor; an interval setting unit configured to specify a distance between articles or a distance between groups of articles to be placed in alignment along the movement direction of the conveyor; a movement amount acquisition unit configured to acquire a movement amount of the placement portion from the detector; a virtual target generation unit configured to generate, before the robot executes a placement operation of an article or a group of articles, a virtual target which serves as a reference in positioning the article on the placement portion; and a placement operation execution unit configured to place the article or the group of articles within the virtual target by tracking the virtual target moving together with the placement portion based on information detected by the detector.

According to a second aspect of the present invention, in the article alignment apparatus of the first aspect, the article or the group of articles is placed at a given position within the virtual target.

According to a third aspect of the present invention, in the article alignment apparatus of the first or second aspect, the virtual target is a virtual tray including at least one placement position.

These and other objects, features and advantages of the present invention will become more apparent in light of the detailed description of exemplary embodiments thereof as illustrated in the drawings.

DETAILED DESCRIPTION OF THE INVENTION

Figure 1:
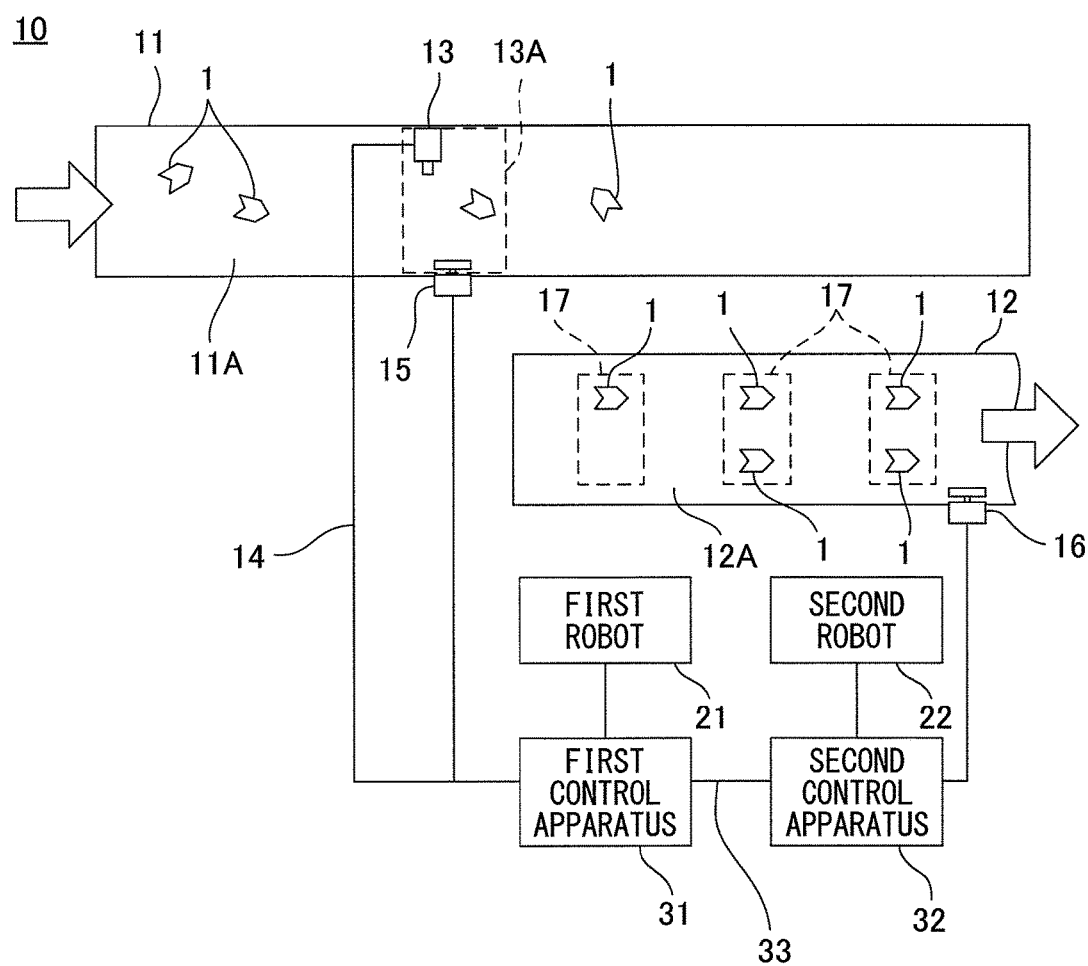
FIG. 1 illustrates a configuration of an article alignment apparatus according to one embodiment.

Embodiments of the present invention will be described below with reference to the accompanying drawings. Scales of the drawings may be changed as necessary for better understanding of the present invention. Identical or corresponding constituent elements are designated with the same reference numerals.

FIG. 1 illustrates a configuration of an article alignment apparatus 10 according to one embodiment. The article alignment apparatus 10 includes a feed conveyor 11 which conveys articles 1 placed at irregular positions and in irregular orientations, a discharge conveyor 12 which conveys the articles 1 aligned according to a predetermined alignment pattern, a first robot 21 and a second robot 22 which move the articles 1 from the feed conveyor 11 to the discharge conveyor 12, and a first control apparatus 31 and a second control apparatus 32 which control the first robot 21 and the second robot 22, respectively. The usage of the article alignment apparatus 10 is not particularly limited, but it may be used at a manufacturing facility of food or medical products, for example.

The feed conveyor 11 and the discharge conveyor 12 respectively include placement surfaces 11A and 12A in the form of substantially flat surfaces, on which the article 1 can be placed. Both of the placement surfaces 11A and 12A move from left to right in a direction shown by an arrow in the drawing, thereby conveying the articles 1 on the placement surfaces 11A and 12A.

The first robot 21 is located upstream of the feed conveyor 11 and the discharge conveyor 12 with respect to the second robot 22. The first robot 21 and the second robot 22 each include a tool which can hold the article 1. The tool may be, for example, a hand or a pneumatic or magnetic suction pad.

The first control apparatus 31 and the second control apparatus 32 are each connected to a network hub, not illustrated, via a connection cable 33. Thus, the first control apparatus 31 and the second control apparatus 32 can transmit data and signals to, or receive them from each other. The transmission and reception of data or the like between the first control apparatus 31 and the second control apparatus 32 may also be performed in another form, such as through wireless communication.

A camera 13 is installed at the upstream of the first robot 21 in the feed conveyor 11. The camera 13 is connected via a line 14 to an image processing apparatus 50 (see FIG. 2) built in the first control apparatus 31. The camera 13 captures an image within a range of a visual field 13A of the camera 13. The captured image is processed by the image processing apparatus 50 to detect a position and an orientation of the article 1.

An encoder 15 is installed in the feed conveyor 11. The encoder 15 outputs a pulse signal in response to a movement amount of the feed conveyor 11. The first control apparatus 31 calculates the movement amount of the feed conveyor 11 based on the pulse signal output from the encoder 15. The second control apparatus 32 can acquire the pulse signal output from the encoder 15 installed in the feed conveyor 11 by communicating with the first control apparatus 31.

Similarly, an encoder 16 is installed in the discharge conveyor 12. The encoder 16 outputs a pulse signal in response to a movement amount of the discharge conveyor 12. The second control apparatus 32 calculates the movement amount of the discharge conveyor 12 based on the pulse signal output from the encoder 16. The first control apparatus 31 can acquire the pulse signal output from the encoder 16 installed in the discharge conveyor 12 by communicating with the second control apparatus 32.

A virtual target 17 is generated on the discharge conveyor 12 at a given position at the upstream of the first robot 21 in the discharge conveyor 12. The virtual target 17 is generated at a predetermined timing before a placement operation is executed by the first robot 21 and the second robot 22. For example, the virtual target 17 may be generated every time the discharge conveyor 12 moves a predetermined movement amount. Alternatively, the virtual target 17 may be generated in response to a signal input to the second control apparatus 32 at a predetermined interval. The virtual target 17 may also be generated when the first robot 21 or the second robot 22 executes a picking up operation of the article 1 on the feed conveyor 11. The embodiment will be described below by way of example, in which the virtual target 17 is generated every time the discharge conveyor 12 moves the predetermined movement amount. However, other methods are different only in timings or conditions to generate the virtual target 17, and the virtual target 17 can be generated in a similar manner. The virtual target 17 functions as a reference of positioning in order to align the article 1 on the placement surface 12A of the discharge conveyor 12. The virtual target 17 includes at least one placement position on which the article 1 is placed and functions as, for example, a virtual tray. According to the illustrated embodiment, the virtual target 17 has a tray shape including two placement positions which are separated from each other in a direction perpendicular to a conveyance direction of the discharge conveyor 12, and the article 1 is placed on each of the placement positions. The placement position may be set at any position in the virtual target 17.

According to the present embodiment, each of the first robot 21 and the second robot 22 successively picks up the article 1 conveyed by the feed conveyor 11 and places it on a predetermined placement position within the virtual target 17 which is generated at a predetermined interval, for example, an equal interval on the discharge conveyor 12. The position of the virtual target 17 is calculated based on the movement amount of the discharge conveyor 12 detected by the encoder 16 installed in the discharge conveyor 12. In this way, the first robot 21 and the second robot 22 can place the articles 1 on the predetermined placement positions by tracking the virtual target 17 moving together with the discharge conveyor 12.

Figure 2:
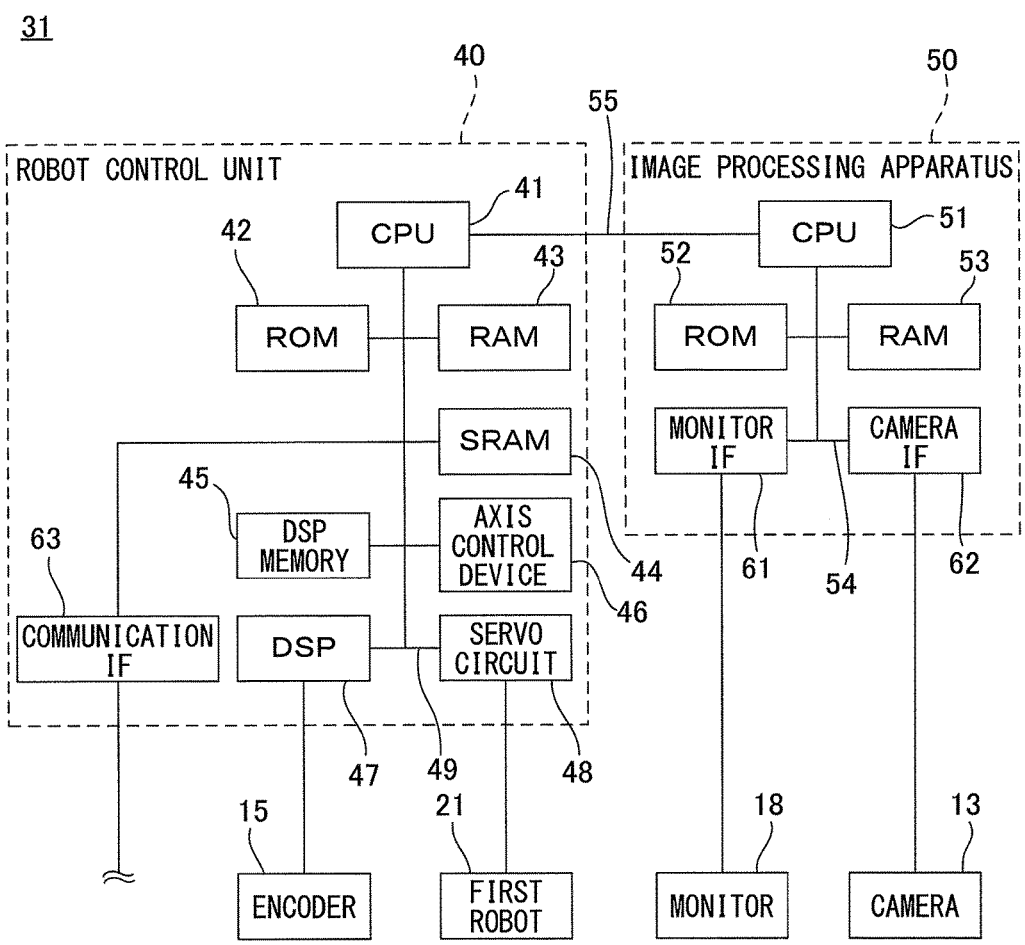
FIG. 2 illustrates an exemplary configuration of a control apparatus for controlling a robot of the article alignment apparatus.

FIG. 2 illustrates a hardware configuration of the first control apparatus 31. The first control apparatus 31 includes a robot control unit 40 which controls the first robot 21 and the image processing apparatus 50 which processes an image captured by the camera 13 to acquire the position and the orientation of the article 1 on the feed conveyor 11.

The image processing apparatus 50 includes a central processing unit (CPU) 51 configured with a microprocessor. To the CPU 51, a read-only memory (ROM) 52, a random access memory (RAM) 53, a monitor interface (monitor IF) 61, and a camera interface (camera IF) 62 are each connected via a bus 54. The monitor IF 61 is connected to a monitor 18 externally provided to the first control apparatus 31. The camera IF 62 is connected to the camera 13. An image captured by the camera 13 is stored in the RAM 53. Data stored in the RAM 53 is analyzed by the CPU 51. The ROM 52 stores various setting information pieces regarding the image processing apparatus 50 as well as an analysis program.

As illustrated in FIG. 2, the CPU 51 of the image processing apparatus 50 is connected to a CPU 41 of the robot control unit 40 via a bus 55 of the first control apparatus 31. To the CPU 41 of the robot control unit 40, a ROM 42, a RAM 43, a static random access memory (SRAM) 44, a digital signal processor data memory (DSP memory) 45, and a digital signal processor (DSP) 47 are each connected via a bus 49. The ROM 42 stores a program for controlling the entire system. The RAM 43 temporarily stores data processed by the CPU 41. The SRAM 44 stores an operation program, setting data, and the like regarding the first robot 21.

The DSP 47 is a processor which processes an output signal of the encoder 15 installed in the feed conveyor 11. The DSP memory 45 stores data processed by the DSP 47, setting parameters, and the like. The DSP 47 has a function of detecting an output of the encoder 15 at any given time point in response to an instruction from the CPU 41 and writing the detected information into a predetermined section of the DSP memory 45. The CPU 51 of the image processing apparatus 50 can also access the DSP memory 45 via the CPU 41 of the robot control unit 40.

The robot control unit 40 includes an axis control device 46 which controls the first robot 21. The axis control device 46 is connected to the first robot 21 via a servo circuit 48, and thus the first control apparatus 31 can control the first robot 21. The robot control unit 40 further includes a communication interface (communication IF) 63, through which the robot control unit 40 can communicate with the second control apparatus 32, an external peripheral apparatus, and the like.

Figure 3:
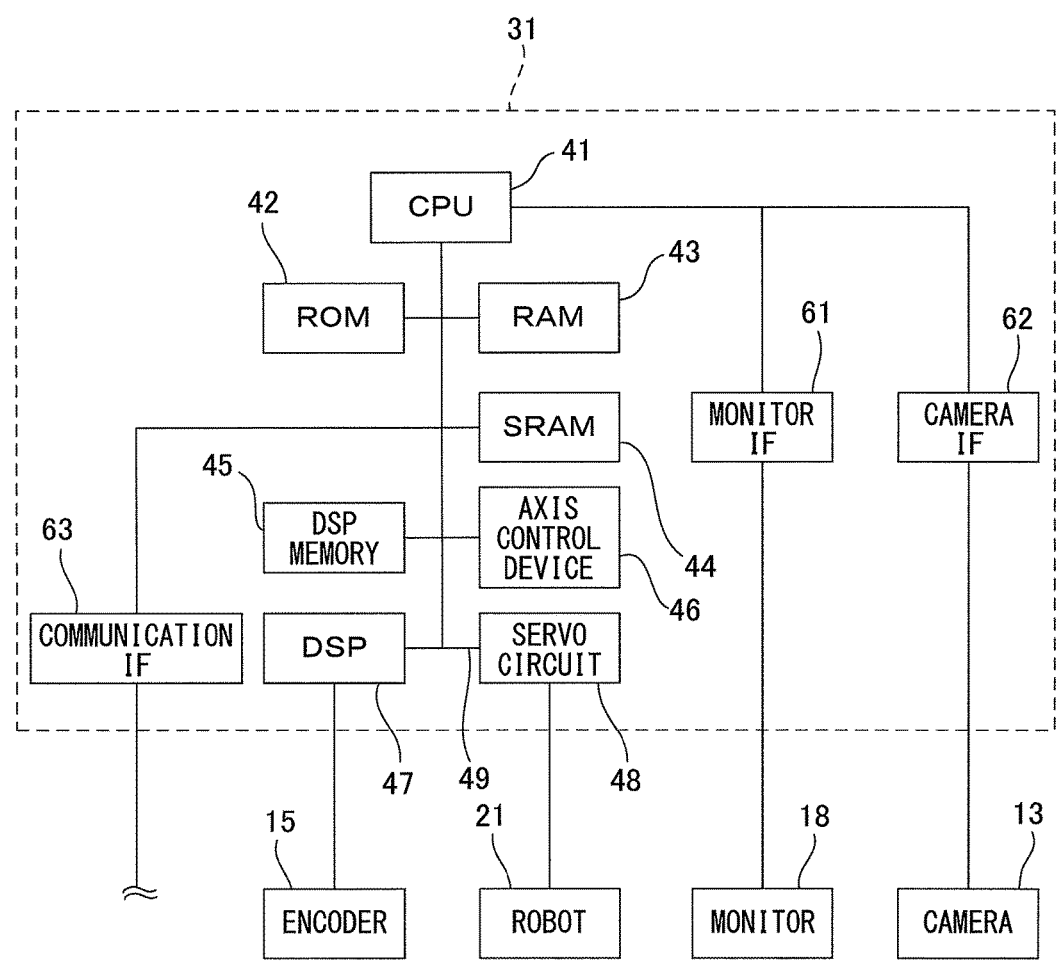
FIG. 3 illustrates another exemplary configuration of the control apparatus.

FIG. 3 illustrates another exemplary configuration of the first control apparatus 31. As illustrated in FIG. 3, the CPU 51, the ROM 52, and the RAM 53 of the image processing apparatus 50 may be substituted with those of the robot control unit 40. The functions of the respective components are the same as those in FIG. 2, and thus descriptions thereof are omitted.

Although not illustrated, the second control apparatus 32 almost has the same configuration as the first control apparatus 31. However, as can be seen from FIG. 1, the second control apparatus 32 is not directly connected to the camera 13 and thus different from the first control apparatus 31 in that the second control apparatus 32 does not need to include a configuration corresponding to the image processing apparatus 50.

Figure 4:
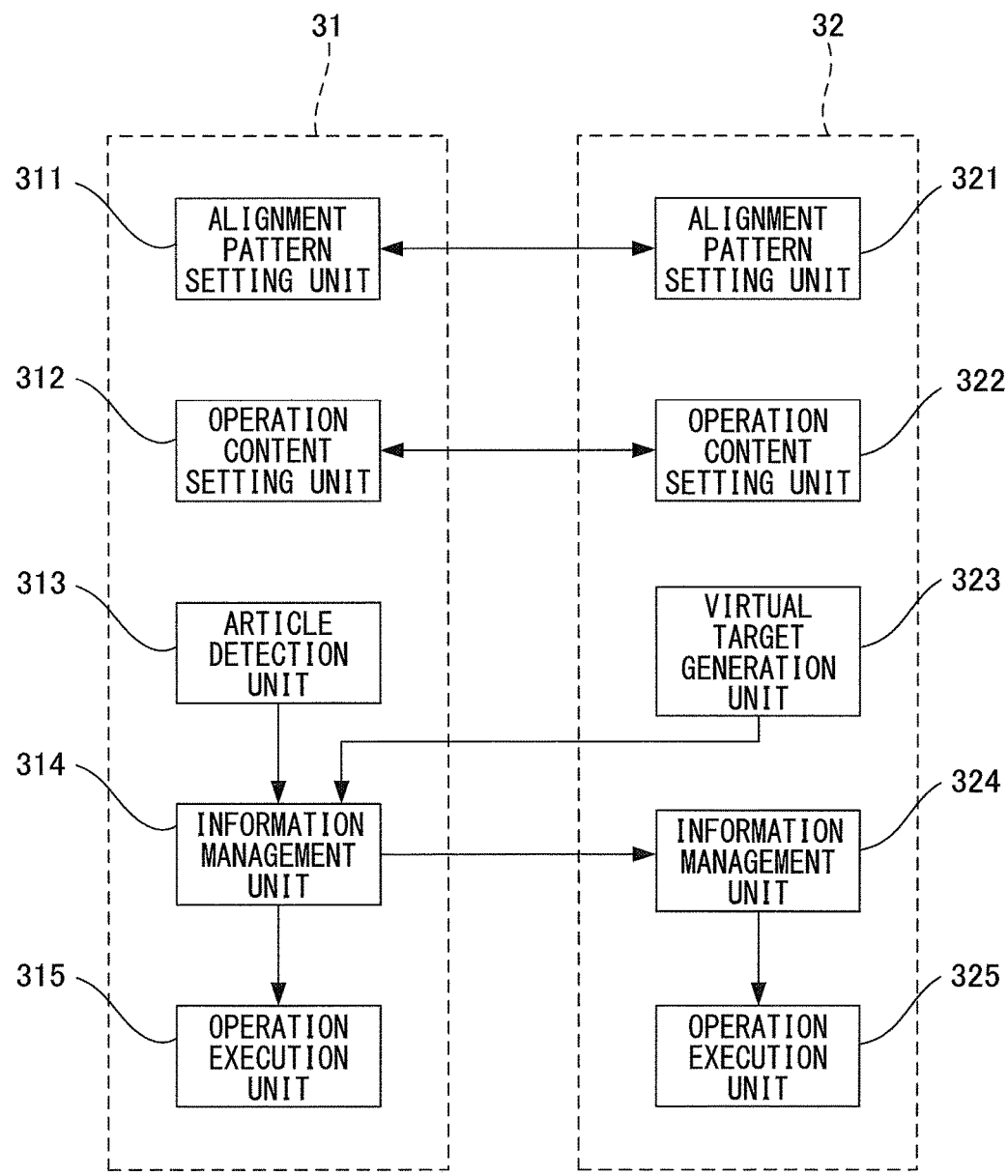
FIG. 4 is a functional block diagram of the control apparatus.

FIG. 4 is a block diagram illustrating functions of processing information regarding a detection process and an alignment process of the article 1 in the first control apparatus 31 and the second control apparatus 32. Arrows in FIG. 4 indicate flows of the information.

As illustrated in FIG. 4, the first control apparatus 31 includes an alignment pattern setting unit 311, an operation content setting unit 312, an article detection unit 313, an information management unit 314, and an operation execution unit 315. The second control apparatus 32 includes an alignment pattern setting unit 321, an operation content setting unit 322, a virtual target generation unit 323, an information management unit 324, and an operation execution unit 325.

The alignment pattern setting units 311 and 321 define an alignment pattern of the articles 1. In the case of the embodiment illustrated in FIG. 1, the alignment pattern is defined as two cells (placement positions) which are separated by a predetermined distance in a direction perpendicular to the conveyance direction of the discharge conveyor 12. In other words, the alignment pattern setting units 311 and 321 function as interval setting units for specifying a distance between the articles 1 aligned along a movement direction of the discharge conveyor 12. A cell position defined by one of the alignment pattern setting units 311 and 321 is transmitted to the other of the alignment pattern setting units 321 and 311 via a communication means. In this way, a common cell position is defined in both of the alignment pattern setting units 311 and 321.

The article detection unit 313 detects the position and the orientation of the article 1 on the feed conveyor 11 every time the feed conveyor 11 moves over a predetermined distance. Alternatively, the article detection unit 313 may execute detection of the position and the orientation of the article 1 when an external sensor, such as a phototube sensor, detects arrival of the article 1. If there is no need to specify the orientation of the article 1, only the position of the article 1 can be a detection target.

There are many techniques known as methods for detecting a position and an orientation of an object (namely, an article 1) from a captured image. The article detection unit 313 uses any known technique to detect the position and the orientation of the article 1 conveyed by the feed conveyor 11 from an image captured by the camera 13. For example, the article detection unit 313 may be configured to detect an image coincide with a model image registered in advance from an image captured by the camera 13 according to the normalized correlation. Alternatively, the article detection unit 313 may extract a contour of the article 1 from a model image registered in advance as in the case of the generalized Hough transformation, and based on the contour information, calculate the position and the orientation of the article 1 in a captured image.

The article detection unit 313 transfers information, such as the detected position and orientation of the article 1 and an output value of the encoder 15 of the feed conveyor 11 at a moment when the camera 13 captured an image of the article 1, to the information management unit 314.

The position and the orientation of the article 1 on the feed conveyor 11 are expressed in a coordinate system defined in relation to the camera 13 (camera coordinate system). However, the position and the orientation of the article 1 in a reference coordinate system to robot operations (robot coordinate system) can be calculated by conventional coordinate transformation based on a positional relationship between the camera coordinate system and the robot coordinate system. Further, when the robot coordinate system is shared with the first control apparatus 31 and the second control apparatus 32, the position and the orientation of the article 1 being detected is used in common by the first robot 21 and the second robot 22. For example, when the position and the orientation of the article 1 are acquired by the image processing apparatus 50, the first control apparatus 31 and the second control apparatus 32 can respectively control the first robot 21 and the second robot 22 to pick up the article 1.

The virtual target generation unit 323 monitors a value of the encoder 16 and generates a virtual target 17 every time the discharge conveyor 12 moves over a predetermined distance. Information of an output value of the encoder 16 of the discharge conveyor 12 at a moment when the virtual target 17 is generated is transferred to the information management unit 314 of the first control apparatus 31. In other words, the virtual target generation unit 323 has a function as a movement amount acquisition unit for acquiring the movement amount of the placement surface 12A of the discharge conveyor 12 from the encoder 16 and a function of generating the virtual targets 17 at predetermined intervals based on the movement amount of the discharge conveyor 12.

A predetermined position where the virtual target 17 is generated is associated in advance with the robot coordinate system of the first robot 21 with respect to the advancing direction of the discharge conveyor 12. Therefore, the information management unit 314 can acquire a current position of the virtual target 17 in the robot coordinate system based on the output value of the encoder 16 of the discharge conveyor 12. At the same time, the information management unit 314 can acquire a position and an orientation of a cell defined for the virtual target 17 according to the alignment pattern from the alignment pattern setting unit 311 of the first control apparatus 31. When the robot coordinate system is shared with the first control apparatus 31 and the second control apparatus 32, the information regarding the position and the orientation of the cell is used in common by the first robot 21 and the second robot 22. If there is no need to specify the orientation of the article 1, only the position of the cell may be acquired.

The operation execution units 315 and 325 receive, from the information management units 314 and 324, the information regarding the positions and the orientations of the articles 1 on the feed conveyor 11 entering into the respective operating areas of the first robot 21 and the second robot 22, and execute processes of picking up the articles 1 by the first robot 21 and the second robot 22. Further, the operation execution units 315 and 325 receive, from the information management units 314 and 324, the information regarding the positions and the orientations of the cells within the virtual target 17 on the discharge conveyor 12 entering into the respective operating areas of the first robot 21 and the second robot 22, and execute processes of placing the articles 1 held by the first robot 21 and the second robot 22 at the positions of the cells. In other words, the operation execution units 315 and 325 have a function as a placement operation execution unit for placing the article 1 in the cell defined within the virtual target 17 by tracking the virtual target moving together with the placement surface 12A of the discharge conveyor 12.

One of the operation content setting units 312 and 322 of the first control apparatus 31 and the second control apparatus 32 sets a working ratio between the first robot 21 and the second robot 22. The working ratio being set is shared with the other of the operation content setting units 322 and 312. For example, when the working ratio between the first robot 21 and the second robot 22 is 1:1, the first robot 21 located in the upstream picks up every other article 1 conveyed by the feed conveyor 11, and places it at the position of a predetermined cell in the virtual target 17 moving together with the discharge conveyor 12. On the other hand, the second robot 22 picks up all of the articles 1 which have passed the operating area of the first robot 21 assigned to the feed conveyor 11, and successively places them at positions of predetermined cells in the virtual target 17.

Figure 5:
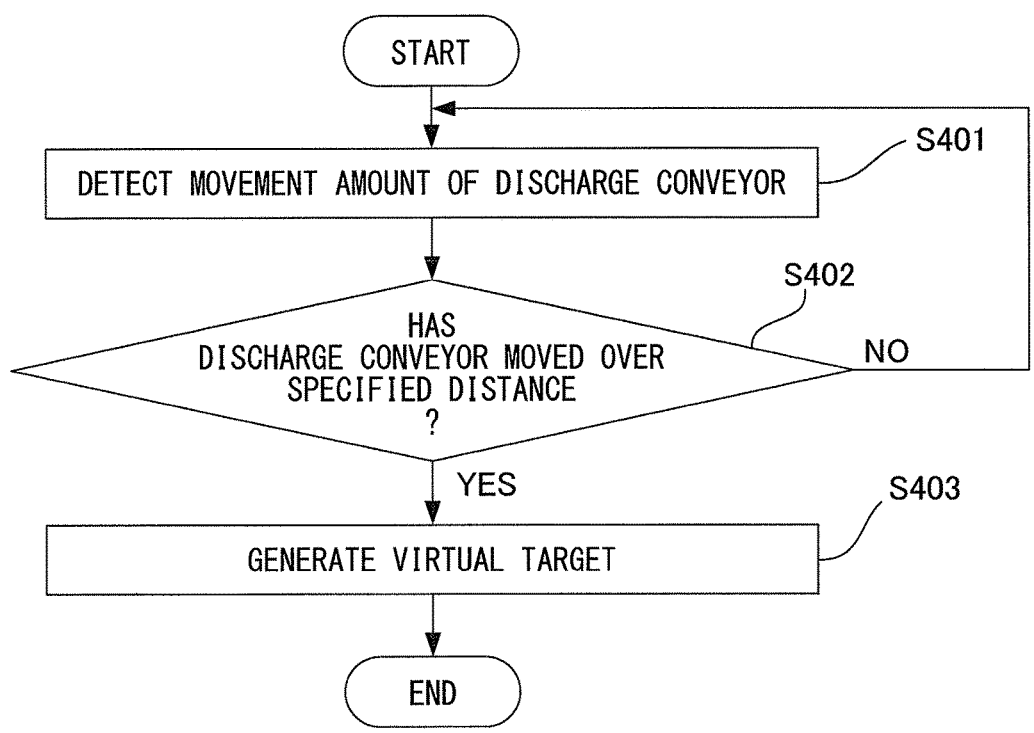
FIG. 5 is a flowchart illustrating processes for generating a virtual tray.

FIG. 5 is a flowchart illustrating processes executed by the virtual target generation unit 323 with a predetermined control cycle. First, at step S401, the virtual target generation unit 323 detects the movement amount of the discharge conveyor 12 based on a difference between a value of the encoder 16 of the discharge conveyor 12 at a time when the last virtual target 17 is generated and a value of the encoder 16 at a current time.

Next, at step S402, it is determined whether or not the discharge conveyor 12 has moved over a distance specified in advance. When the determination result at step S402 is negative, the process returns to step S401. When the determination result at step S402 is positive, the process proceeds to step S403, at which the virtual target 17 is generated at a predetermined position on the discharge conveyor 12. For example, the positions on which the virtual targets 17 are generated are set to positions at a specified distance from each other starting from the first virtual target 17 which is initially generated at the start of the program. In other words, an interval between the virtual targets 17 is equal to the specified distance. Alternatively, the virtual targets 17 may be generated at an interval equal to N times as long as the specified distance. For example, if a movement speed of the discharge conveyor 12 is high enough that the discharge conveyor 12 has already moved over a distance equal to or more than N times (N>1) of the specified distance at the time of the determination at step S402, it may be difficult to place the article 1 at a position at the specified distance from the virtual target 17 generated immediately before then. Therefore, in such a case, a generation position of the virtual target 17 may be changed so that an interval between the virtual targets 17 becomes larger.

Figure 6:
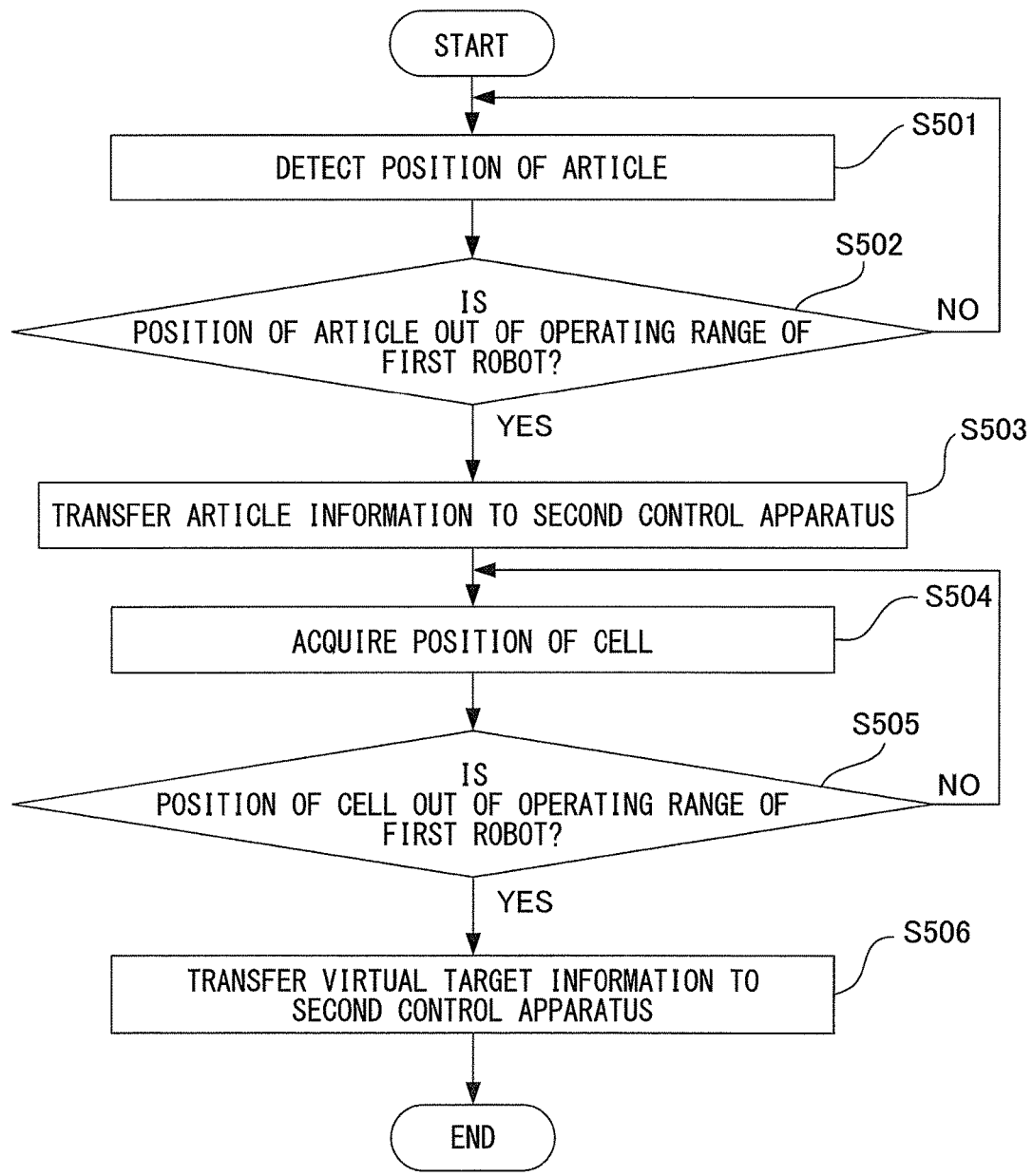
FIG. 6 is a flowchart illustrating processes for transferring information between a plurality of control apparatuses.

FIG. 6 is a flowchart illustrating processes executed by the information management unit 314 of the first control apparatus 31 in a predetermined control cycle. First, at step S501, the information management unit 314 updates a current position of each article 1 conveyed by the feed conveyor 11, based on a movement amount of the article 1 captured by the camera 13. The movement amount of the article 1 is acquired by the article detection unit 313, based on a difference between an output value of the encoder 15 at a time when the camera 13 captures an image of the article 1 and an output value of the encoder 15 at a current time.

Next, at step S502, it is determined whether or not the current position of the article 1 is out of an operating range of the first robot 21. When the determination result at step S502 is negative, the process returns to step S501. When the determination result at step S502 is positive, the process proceeds to step S503, at which the information management unit 314 of the first control apparatus 31 transfers the information regarding the article 1 (article information) to the information management unit 324 of the second control apparatus 32 located downstream thereof. The article information to be transferred includes, but is not limited to, the position and the orientation of the article 1, the output value of the encoder 15 at a time when an image of the article 1 is captured, and the like.

At step S504, the position of the cell within the virtual target 17 which is defined according to the alignment pattern is acquired. The position of the cell is acquired based on the generation position of the virtual target 17, the movement amount of the virtual target 17, and a positional relationship between the virtual target 17 and the cell.

At step S505, it is determined whether or not the position of the cell is out of the operating range of the first robot 21. When the determination result at step S505 is negative, the process returns to step S504. When the determination result at step S505 is positive, the process proceeds to step S506, at which the information management unit 314 of the first control apparatus 31 transfers the information regarding the virtual target 17 (virtual target information) to the information management unit 324 of the second control apparatus 32 located downstream thereof. The virtual target information to be transferred includes, but is not limited to, the position and the orientation of the cell in the virtual target 17, the output value of the encoder 15 at a time when the camera 13 captured an image of the article 1, an operation completion flag indicating that the picking up process of the articles 1 by the first robot 21 is completed, and the like.

The second control apparatus 32 controls the second robot 22 to pick up the article 1 from the feed conveyor 11 and place it within the virtual target 17 on the discharge conveyor 12, based on the article information and the virtual target information transferred from the information management unit 314 of the first control apparatus 31.

As described above, the article alignment apparatus 10 according to the present embodiment is configured to place the article 1 picked up from the feed conveyor 11 on the virtual target 17 generated on the discharge conveyor 12 by tracking the virtual target 17. Accordingly, the article alignment apparatus 10 does not need to use an actual tray for aligning the articles 1 at a predetermined interval and a sensor for detecting the tray. Further, the article alignment apparatus 10 does not need to use a servomotor for moving the discharge conveyor at a predetermined pitch. Therefore, the present invention can provide an inexpensive article alignment apparatus having a simple configuration.

The article alignment apparatus including two robots and two control apparatuses for controlling the robots has been described based on the illustrated embodiment. However, the present invention can be implemented by an article alignment apparatus including only one robot and control apparatus or including three or more robots and control apparatuses.

Effect of the Invention

According to the article alignment apparatus having the above-described configuration, the robot tracks the virtual target moving together with the conveyor based on a movement amount of the conveyor and successively places articles in alignment on the conveyor. Accordingly, there is no need for a sensor which detects a mark or a container which serves as a reference in positioning the articles in alignment. Further, an expensive servomotor is unnecessary to drive the conveyor. Therefore, the present invention can provide an inexpensive article alignment apparatus having a simple configuration.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. An article alignment apparatus, comprising:
   a conveyor which includes a placement portion on which an article is placed, and a detector for detecting a movement amount of the placement portion;
   a robot which includes a tool capable of holding an article and is configured to successively place an article or a group of articles having a predetermined positional relationship relative to each other, in alignment on the placement portion along a movement direction of the conveyor;
   an interval setting unit configured to set a distance between articles or a distance between groups of articles to be placed in alignment along the movement direction of the conveyor;
   a movement amount acquisition unit configured to acquire a movement amount of the placement portion from the detector;
   a virtual target generation unit configured to successively generate, before the robot executes a placement operation of an article or a group of articles, virtual targets which serve as a reference in positioning the article on the placement portion directly on the conveyor, the virtual targets each having a plurality of placement positions within a predefined area and being separated from each other by a distance which is determined according to the distance between the articles or the distance between the groups of articles specified by the interval setting unit, each of the plurality of placement positions set at any position within the predefined area of the virtual target; and
   a placement operation execution unit configured to place the article or the group of articles directly on the conveyor at least one of the placement locations selected within the predefined area of the virtual target by tracking the virtual target moving together with the placement portion based on information detected by the detector.

2. The article alignment apparatus according to claim 1, wherein the article or the group of articles is placed at a given position within the virtual target.

3. The article alignment apparatus according to claim 1, wherein the virtual target is a virtual tray including at least one placement position.

* * * * *